United States Patent [19]

Kratsch et al.

[11] 4,252,588
[45] Feb. 24, 1981

[54] METHOD FOR FABRICATING A REINFORCED COMPOSITE

[75] Inventors: Kenneth M. Kratsch, Laguna Beach; David A. Eitman, Huntington Beach, both of Calif.

[73] Assignee: Science Applications, Inc., La Jolla, Calif.

[21] Appl. No.: 834,525

[22] Filed: Sep. 19, 1977

[51] Int. Cl.² .................. C04B 37/00; B32B 5/12; B32B 31/16
[52] U.S. Cl. .................. 156/73.6; 156/89; 156/296; 428/105; 428/113; 428/408; 428/902; 264/69
[58] Field of Search .............. 428/105, 406, 367, 379, 428/325, 327, 408, 387, 195, 198, 242, 902; 156/89, 276, 73.6, 296; 427/214, 258, 222; 264/69

[56] References Cited

U.S. PATENT DOCUMENTS

| 3,501,048 | 3/1970 | Strickland et al. | 428/105 X |
| 3,949,126 | 4/1976 | Crawford, Jr. | 428/113 |
| 4,000,027 | 12/1976 | Dalle et al. | 156/73.6 |
| 4,059,712 | 11/1977 | Bothwell | 156/89 X |

OTHER PUBLICATIONS

AIAA Paper No. 76-607, M. A. Maistre; "Development of a 4D Reinforced Carbon-Carbon Composite".
"Advanced Composite Materials in Spacecraft", Article in Sep. 1970 Issue of *Modern Plastics*, J. D. Forest, pp. 136-140.

*Primary Examiner*—George F. Lesmes
*Assistant Examiner*—Daniel R. Zirker
*Attorney, Agent, or Firm*—Bruno J. Verbeck; Michael L. Slonecker

[57] ABSTRACT

An improved method for the fabrication of a reinforced composite. The method includes assembling rigid rods into a geometric structure such that all interstitial voids are interconnected, infiltrating the geometric structure with particles, impregnating the infiltrated geometric structure with an appropriate liquid matrix binder or precursor, and treating the impregnated geometric structure such that the binder solidifies to form the reinforced composite.

16 Claims, 4 Drawing Figures

METHOD FOR FABRICATING A REINFORCED COMPOSITE

BACKGROUND OF THE INVENTION

1. FIELD OF THE INVENTION

This invention relates to a new and unique method or technique for the fabrication of reinforced composites. Reinforced composites are used in a wide variety of applications; for example, carbon composites are useful in the construction of structures having to withstand high-temperature environments, and are, therefore, useful in constructing nose tips, rocket nozzles, heat shields, gas turbines in atomic reactors and bioprosthetic devices requiring thermomechanical properties. The improved reinforced composites demonstrate superior thermo-mechanical and thermo-chemical properties with improved material quality and reduced fabrication costs.

2. BRIEF DESCRIPTION OF THE PRIOR ART

A wide range of reinforced composite structures and materials are now available. The AIAA Paper No. 76-607 presented at the Propulsion Conference in Palo Alto, Calif. on July 26-29, 1976, entitled "Development of a 4D Reinforced Carbon-Carbon Composite," by M. A. Maister, Societe Europeene de Propulsion, Blanquefort, France, discusses significant properties of a carbon composite. Some conventional carbon composite structures are fabricated from prerigidized rods, which are produced by a pultrusion process, and assembled in a geometric pattern or geometric structure. Others are woven using carbon yarn. A variety of geometric structures have been developed to provide specific characteristics which satisfy physical requirements that are imposed by the ultimate application of the carbon composite.

The filler or matrix is formed in a carbon composite through either the liquid or dry process. The dry process consists of continually depositing carbon, inside the porosity or voids within the structure, by cracking therein a gaseous hydrocarbon such as methane. The liquid process consists of impregnating the porous texture of the structure with an organic compound or precursor which is converted into a char by carbonization. The organic compound consists of a thermo-setting resin such as phenolic or furane resin or a fusible substance such as pitch. Due to the low volume of yield of char in these products, the impregnation carbonization cycle is generally repeated several times.

SUMMARY OF THE INVENTION

This invention relates to an improved method for the fabrication of a reinforced composite. While the method employed in this invention is similar in some respects to the conventional method used in the fabrication of carbon composites, the improved method requires that all interstitial voids within the geometric structure be interconnected and infiltrated with particles. The improved method substantially increases the quality and homogeneity of the reinforced composite at a considerably reduced cost.

The infiltration of the particles into the geometric structure is best accomplished by pouring appropriately sized particles into and through the interstitial voids of the structure while simultaneously exposing the structures to a suitable vibration. The vibration causes the particles to filter down through the interconnecting nexus and fill the intersititial voids. This process may be repeated using, sequentially smaller and smaller particles to substantially fill the interstitial voids of the geometric structure. After the structure has been filled with the appropriate particles, the composite is formed by conventional processes, such as by sintering, or by the dry or liquid process discussed above, or by other means of solidifying the impregnated binder or binder precursor.

The method of this invention may be practiced using materials for the rigid rods which include carbon, ceramic, or metallic compounds; and using materials for the particles which include carbon-graphite, ceramic, or metallic compounds; and using materials for the precursors which include thermo-setting resins, such as phenolic, epoxy, or furanic resins, or thermo-plastic carbons such as coal tar pitch, petroleum pitch, or a ceramic precursor such as sodium silicate or borax solution.

It is an object of this invention to provide an improved reinforced composite which has the interstitial voids of the composite structure substantially filled with particles. It is a further object of this invention to provide a method for fabricating a reinforced composite which has the interstitial voids of the composite structure substantially filled with particles. A further object of this invention is to provide a method for fabricating a reinforced composite having improved material quality and reduced fabrication costs. A further object of this invention is to provide an improved reinforced carbon composite which has superior thermo-mechanical and thermo-chemical properties.

It is an object of this invention to provide a method for fabricating a reinforced composite which has the interstitial voids of the geometric structure substantially filled with particles and which composite is generally independent of the materials used in its fabrication.

BRIEF DESCRIPTION OF THE DRAWINGS

This invention will be more fully understood by the following description and attached drawings, in which.

DESCRIPTION OF THE PREFERRED EMBODIMENTS

Figure 1:
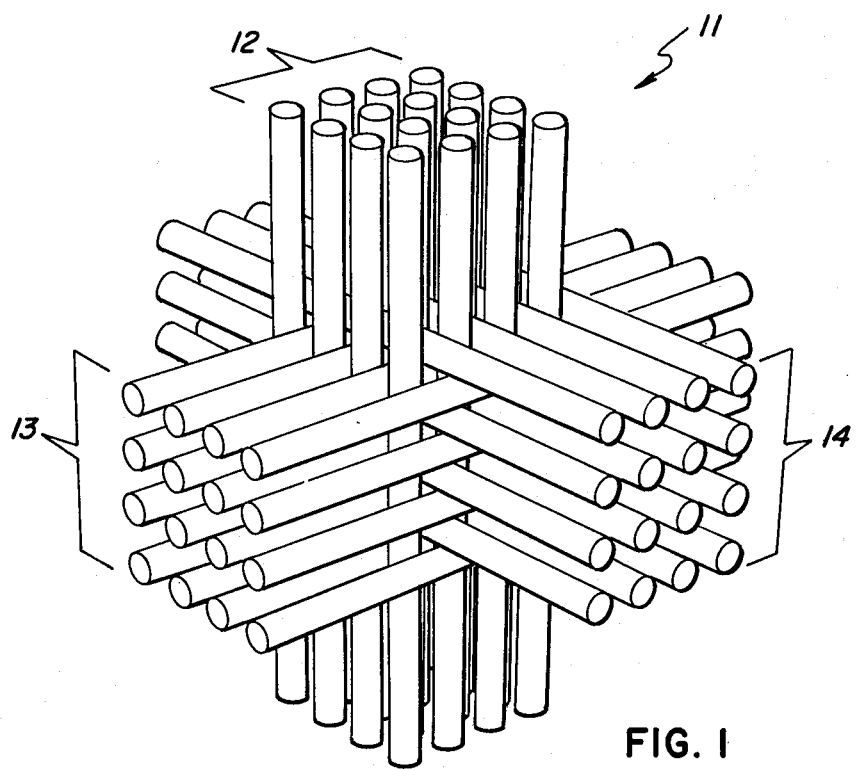
FIG. 1 is a view in perspective of a geometric structure having 3D texture.

FIG. 1 shows a geometric structure of a reinforced composite with a 3D texture. The 3D texture is formed by interlacing three bundles of reinforcing elements such as rigidized rods. The direction of each bundle is described as being perpendicular to each of the other two bundles. Specifically, the 3D texture, shown generally at 11, includes a verticle bundle 12 which is perpendicular to the left horizontal bundle 13 and each of which is perpendicular to the right horizontal bundle 14.

Figure 2:
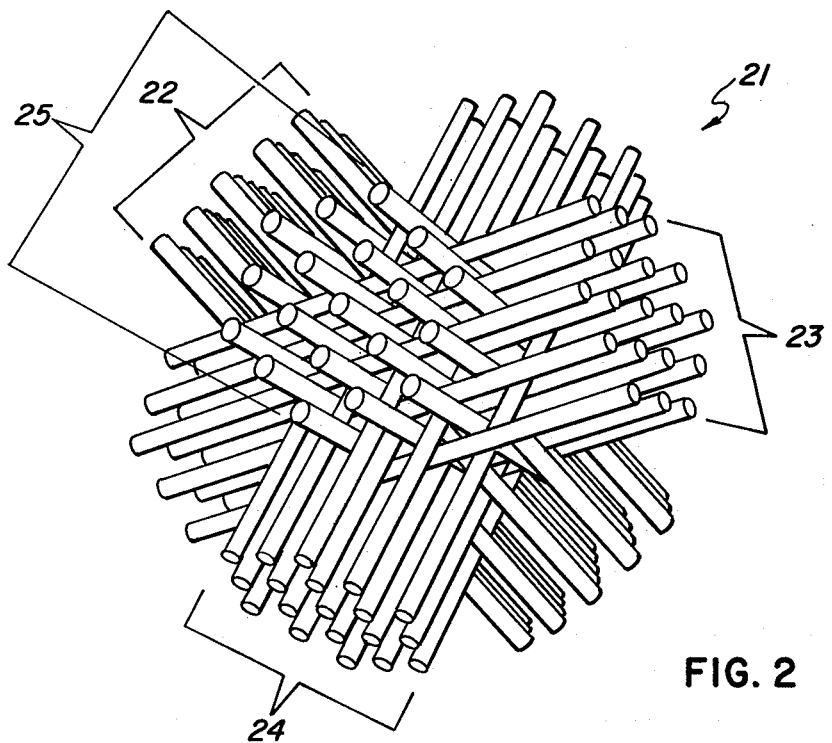
FIG. 2 is a view in perspective of a geometric structure having a 4D texture.

FIG. 2 shows a geometric structure of a reinforced composite with a 4D texture, formed by interlacing four bundles of reinforcing elements. The 4D texture, shown generally at 21, includes a first bundle 22, a second bundle 23, a third bundle 24 and a fourth bundle 25, each of which describes an angle of 70½ degrees with each of the other three bundles.

A wide variety of geometric structures are available and, for example, a geometric structure for a reinforced composite with 7D texture can be formed by combining the 3D texture and the 4D texture. Typically, a given geometric structure is designed to satisfy specific physical requirements of the reinforced composite. The invention described herein is independent of any given geometric structure and is applied generally to all such variations having interconnecting interstitial voids.

Figure 3:
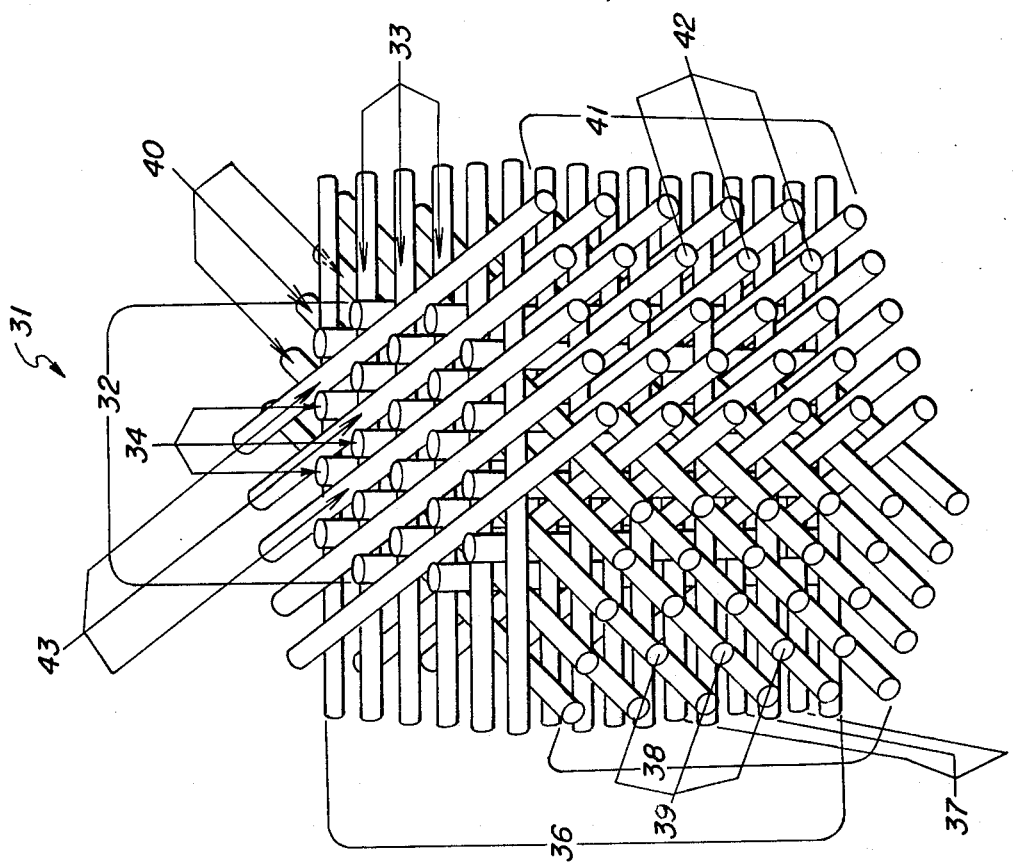
FIG. 3 is a view in perspective of a preferred geometric structure used in carrying out the method of this invention.

FIG. 3 shows a preferred geometric structure for use in the method of the present invention; a form of 4D texture. Specifically, the preferred structure, shown generally at 31, includes four bundles one of which, hereinafter referred to as the first bundle (sometimes referred to as the "z" bundle) includes a plurality of parallel vertical rods 32 which can be described as being arranged in a plurality of spaced rows 33 and a plurality of spaced columns 34 such that the distance between adjacent rods 32 within a row 33 is equal to the distance between adjacent rows 33 divided by the sine of 60°; and whereby every other column 34 is shifted in a direction parallel to the column 34 an amount equal to one-half the distance between adjacent rows 33 so that in plan view the center of any three nearest adjacent vertical rods 32 form an equilateral triangle in close packed relation. The preferred structure 31 further includes a second bundle of parallel-horizontal rods 36 (sometimes arbitrarily referred to as the "u" bundle) which are each perpendicular to the vertical rods 32, and which are arranged in a plurality of parallel-horizontal levels 37, whereby each horizontal rod 36 of each horizontal level 37 can be described as being positioned between adjacent rows 33 of vertical rods 32. A third bundle or parallel-left-diagonal rods 38 (sometimes referred to as the "v" bundle) is characterized in that each left-diagonal rod 38 is perpendicular to the vertical rods 32 and arranged in a plurality of parallel-horizontal-left-diagonal levels 39 whereby each left-diagonal level 39 can be described as being positioned below one of said horizontal levels 37, and whereby each left-diagonal rod 38 can be described as being rotated through a horizontal angle of 60° relative to said horizontal rods 36, and is positioned within left-diagonal alleys 40 developed by the orientation of the close-packed, equilaterally arranged vertical rods 32. The preferred structure includes a fourth bundle of right-diagonal rods 41 (sometimes referred to as the "w" bundle) which are similar to the left-diagonal rods 38. Each of the right-diagonal rods 41 is perpendicular to the vertical rods 32 and is arranged in a plurality of parallel-horizontal-right-diagonal levels 42 whereby each right-diagonal level 42 can be described as being positioned below one of said left-diagonal levels 39 and, therefore, above one of said horizontal levels 37, and whereby each right-diagonal rod 41 can be described as being rotated through a horizontal angle of 60° relative to said left-diagonal rod 38, and is positioned within right-diagonal alleys 43 developed by the orientation of the close-packed, equilaterally arranged vertical rods 32.

The improved method for the preparation of a carbon based reinforced composite requires the preparation of the rigidized rods. These rods are produced by a pultrusion method, as referred to in the above-referenced article, whereby unidirectional groups of graphite or carbon yarn having enough fibers to make up a 0.05 inch diameter yarn group are assembled and impregnated with a thermo-setting or thermo-plastic resin or binders. An appropriate carbon or graphite yarn is Union Carbide's T-300, or Union Carbide's T-50, or Hercules HM-3000. Precursors which are satisfactory include thermo-setting resins such as phenolic, epoxy, furanic resins and thermo-plastic carbon, such as coal tar pitch, LEXAN (trademark) or petroleum pitch. A satisfactory binder or precursor in Monsanto's Risonox SC-1008.

The impregnated yarn groups are drawn through a die which is warmed to approximately 300° F. and which has a diameter determined such that a 0.05 inch rod is extruded. The specific temperature of the die is determined by the cure characteristics of the particular binder.

The rods are assembled into the preferred geometric structure (see FIG. 3), which is carefully prepared to insure strict conformity with the preferred pattern. The dimensions of the interstitial voids and interconnecting nexus of the assembly are determined by the rod dimension and geometric structure selected. The geometric structure is thus tailored to provide specific dimensional relationships. For example, the preferred structure shown in FIG. 3 using a circular 0.05 inch diameter rod has an interconnecting nexus width of approximately 0.017 inches. In an alternate preferred embodiment the vertical rods 32 have a hexagonal cross-section and the horizontal rods 36, the left-diagonal rods 38, and the right-diagonal rods 41 have rectangular cross-sections.

The method of the present invention for a carbon-based reinforced composite fills the interstitial voids of the assembled structure with first graphite or carbon particles whose diameters are approximately one-third the width (−40, +45 mesh) of the interconnecting nexus. This infiltrating by the carbon particles is accomplished by pouring the particles into the structure while subjecting it to vertical vibrations. Specifically, the structure is encased in an appropriate container, generally constructed of graphite so that it is compatible with subsequent heat treatment. The container, with the encased structure is subjected to vertical vibrations using conventional vibrating equipment, such as a Narco BH 1¼ pneumatic piston kin rapper, which delivers vertical acceleration of approximately 2.5 G's, at approximately 2,000 cycles per minute, with a displacement of approximately 0.003 inches. During the vibration of the encased structure sufficient first graphite or carbon particles are deposited in the container to fill all interstitial voids within the structure. Generally a head of carbon particles forms over the encased structure and upwards of ten minutes of vibration is required to complete the infiltration process. To encourage the migration of the first particles down through the structure, during the infiltration process, a head weight of approximately one to five pounds per square inch, is placed on top of the head of carbon particles.

After complete infiltration of the first carbon particles a second, smaller size particle is infiltrated into the once-filled structure, the smaller size particle having a diameter of approximately one-seventh the diameter (−230, +270 mesh) of the first carbon particles. The process of infiltrating the second smaller particle includes depositing the smaller particles into the container with the encased once-filled structure and placing a head weight over the top of them while the structure is experiencing vertical vibrations. Again, the head weight is used to promote the downward migration of the smaller particles. The infiltration process can be repeated a third time with an even smaller size third carbon particle or a carbon powder, approximately one-third the size (10 micron) of the intermediate second smaller particle, to fill, as completely as possible, the interstitial voids within the structure. The third filling process similarly includes depositing the carbon powder into the container, with the encased second-filled structure, and placing the head weight over the powder while exposing it to vertical vibrations.

After the geometric structure has been substantially filled, the composite is formed either by sintering the filled structure, thereby avoiding the requirement for other materials, by chemically solidifying the impregnated precursor, or by the dry or liquid process. While the dry process, which consists of continually depositing carbon inside the porosity of the filled structure by cracking a gaseous hydrocarbon such as methane, is acceptable, the liquid process is preferred.

In the liquid process the porous texture of the filled structure is impregnated with a thermo-setting resin or thermo-plastic carbon precursor, as described above, that is converted into a char by carbonization. The filled structure is vacuum impregnated with a precursor at approximately 200° C.; that is, the structure is placed in a chamber, the gases are removed therefrom creating a vacuum, then the liquid precursor is introduced. The impregnated structure is then placed in an oven and heated in an inert atmosphere to a temperature of 1,000° C. at a rate of approximately 30° C. per hour. The combination of rods, particles, and binder is allowed to cool to below 400° C., when it is reheated to a temperature of between 2,500° C. to 3,000° C. at a rate of approximately 200° C. per hour.

The impregnation and carbonization cycle may be repeated as often as may be needed. Thus, the once impregnated and heated composite may again be vaccum impregnated with an appropriate precursor then subjected a second time to a temperature of 1,000° C. imposed at a rate of 30° per hour. The composite is then permitted to cool below 400° C. where it is reheated to between 2,500° C. to 3,000° C. at a rate of approximately 200° C. per hour. These steps may be further repeated to fully densify the carbon reinforced composite.

If silicon dioxide, silicon nitrate, or various other protective ceramic materials are used in combination with the carbon particles, the composite described above is suited for use in a high temperature oxidizing environment of up to 3,000° F. In a highly erosive environment where a large number of high-speed particle impacts are anticipated, the erosion resistance of the material may be improved by the selection of an appropriate carbide particle. A metal reinforced composite may be fabricated by assembling the geometric structure with metal rods and infiltrating the structure with metal particles then sintering the filled geometric structure. Other forms of the reinforced composite include ceramic and organic fiber structure.

Figure 4:
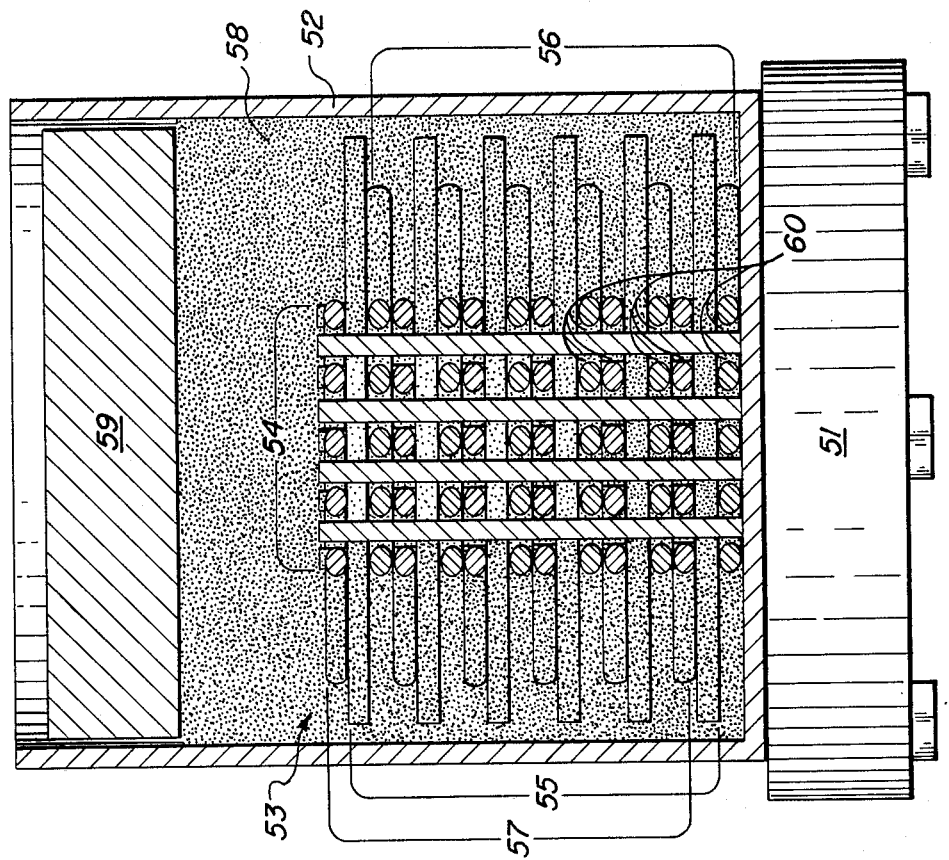
FIG. 4 is a sectional view showing the preferred geometric structure being infiltrated with particles whereby the interstitial voids are filled.

FIG. 4 shows in cross-section the geometric structure during the infiltration process. The vibration means 51 is applied to the container 52 in which is encased the geometric structure 53 (similar in structure to that shown in FIG. 3). The geometric structure, seen in cross-section, includes the vertical bundles 54, the horizontal bundles 55, left-diagonal bundles 56 and the right-diagonal bundle 57. The container is filed with particles 58 and a head weight 59 is placed thereon to promote the downward migration of the particles through the connecting nexus 60 of the geometric structure.

The generic form of my invention includes rigid rods which are assembled into a geometric structure having interconnected interstitial voids, a flowable particulate infiltrated into the interconnected interstitial voids of the assembled structure, and a liquid precursor impregnated into the filled structure, treated such that the precursor is solidified whereby to form the improved composite. By way of example only, materials which are satisfactory for use with my invention include for the rigid rods, wood, organic materials, plastic materials, carbon or graphite materials, ceramic materials, or metallic materials; and for the flowable particulate; carbon or graphite particles, ceramic particles, or metallic particles; and for the precursor any liquid which after either chemical or heat treatment is converted into a solid and thus forms the composite, such as thermo-setting resins, to include phenolic, epoxy, furanic resins, or LEXAN (a trademark material), or thermo-plastic carbons, to include, coal tar pitch, or petroleum pitch or ceramic binders like sodium silicate and Borax solution.

The heat treatment would include both the treatment to high and low temperature. Chemical treatment includes both the reduction reactions enabled by the high temperature heat treatments and conventional chemical reactions such as combining a Borax solution with ammonia to form a composition containing boron, nitrogen and hydrogen then heating the boron composition to form the solidified boron nitride.

The method of the invention is satisfied by the use of any combination of the above described materials and the criteria for selecting a specific combination is determined by the resulting composite's ultimate use and application.

The reinforced composite defined by this invention and the method for fabricating a reinforced composite defined by this invention substantially improves the physical properties and the material quality of the reinforced composite. It can readily be seen from the above that variant forms of the reinforced composite and of the method for the fabrication of a reinforced composite using a variety of geometric structures, a variety of rods, particles, and precursor materials, and a variety of combinations of these materials can easily be developed. Therefore, such variant forms are considered to be within the scope and essence of this invention.

What is claimed is:

1. An improved method for fabricating a reinforced composite which comprises:
   (a) assembling rigidized rods composed of a material selected from the group consisting of carbon, ceramic, metals, and combinations thereof, into a three-dimensional geometric structure such that all interstitial voids have interconnecting nexuses;
   (b) infiltrating dry flowable particles composed of a material selected from the group consisting of carbon, ceramic, metals and combinations thereof, into the said structure while vibrating the structure whereby the interstitial voids within the structure are substantially filled;
   (c) impregnating the filled structure with a precursor; and
   (d) treating the impregnated, filled structure to effect solidification of said precursor whereby to form said reinforced composite.

2. The method of claim 1 wherein the precursor consists of a member selected from the group consisting of phenolic resins, epoxy resins, furan resins, thermo-plastic carbon, coal tar pitch, and petroleum pitch.

3. The method of claim 1 wherein said rigidized rods have a circular cross-section.

4. The method of claim 1 wherein the geometric structure is characterized as consisting of a bundle of parallel vertical rods arranged in a plurality of spaced rows and a plurality of spaced columns whereby to form a close-packed, equilateral array of said vertical rods, a bundle of parallel horizontal rods which are each perpendicular to the vertical rods and which are arranged in a plurality of parallel horizontal levels, and whereby the horizontal rods within each horizontal level are positioned between rows of vertical rods, a bundle of parallel-left-diagonal rods which are each perpendicular to the vertical rods and which are arranged in a plurality of parallel-horizontal-left-diagonal levels whereby each left-diagonal level is positioned below one of said horizontal levels, and whereby each left-diagonal rod is rotated through a horizontal angle of 60° relative to said horizontal rods and is positioned within left-diagonal alleys developed by the orientation of the close-packed, equilaterally arranged vertical rods, and a bundle of parallel right-diagonal rods which are each perpendicular to the vertical rods and which are arranged in a plurality of parallel-horizontal-right-diagonal levels whereby each right-diagonal level is positioned below a left-diagonal level, and whereby each right-diagonal rod is rotated through a horizontal angle of 60° relative to said left-diagonal rods, and is positioned within right-diagonal alleys developed by the orientation of the close-packed, equilaterally arranged vertical rods.

5. The method of claim 4 wherein said vertical rods, said horizontal rods, said left-diagonal rods, and said right-diagonal rods all have a circular cross-section.

6. The method of claim 4 wherein said vertical rods have a hexagonal cross-section, and wherein said horizontal rods, said left-diagonal rods, and said right-diagonal rods all have a rectangular cross-section.

7. The method of claim 1 wherein the rigidized rods are prepared by bundling carbon yarn into groups, impregnating the yarn groups with a precursor, drawing the impregnated yarn groups through a die heated to between 100°–500° C., and heat-treating the drawn yarn groups to form rigidized rods.

8. The method of claim 1 wherein treating the impregnated filled structure includes heating the impregnated structure at a rate of 30° C. per hour to a temperature of approximately 1,000° C., cooling the heated structure to below 400° C., reheating the cooled structure to between 2.500° C. to 3,000° C. at a rate of approximately 200° per hour.

9. The method of claim 1 wherein the step of infiltrating the particles into the said structure while vibrating the structure includes encasing the assembled structure within a container, adding particles to the container, and vibrating said structure and particles within said container whereby said particles migrate into the voids within the structure to form a once-filled structure.

10. The method of claim 9 wherein the rigidized rods are carbon based cylindrical rods with a diameter of 0.05 inches, wherein the first particles are carbon and characterized as U.S. screen size −40, +45 mesh.

11. The method of claim 9 wherein said once-filled structure is infiltrated a second time by encasing the once-filled structure within the container; adding second particles, smaller than said first particles, to the container, and vibrating said once-filled structure and second particles within said container whereby said second particles migrate into the voids within the once-filled structure to form a second-filled structure.

12. The method of claim 11, wherein said second particles are carbon, and are of a diameter characterized as U.S. Screen Size −230, +270 mesh.

13. The method of claim 11 wherein the second-filled structure is infiltrated a third time by encasing the second-filled structure within the container; adding third particles, smaller than said second particles, to the container; vibrating said second-filled structure and third particles within said container whereby said third particles migrate into the voids within the second-filled structure to form a third-filled structure.

14. The method of claim 13, wherein said third particles are carbon, and are approximately 10 microns in size.

15. An improved method for fabricating a reinforced composite which comprises:

(a) assembling rigidized rods into a geometric structure such that all interstitial voids are interconnected, said rigidized rods being formed by bundling carbon yarn into yarn groups, impregnating said yarn groups with a precursor, drawing the impregnated yarn groups through a die heated to between 100°–500° C., and heat-treating the drawn yarn groups.

(b) infiltrating the geometric structure with particles such that the interstitial voids within the geometric structure are substantially filled, said infiltration with particles including encasing the structure within a container, pouring carbon-based first particles, characterized as U.S. screen size −40, +45 mesh, into the container, vibrating said structure and first particles within said container whereby said first particles migrate through the voids within the structure, assisting said migration of said first particles by placing a head weight over the top of said first particles during said vibration to form a once-filled structure, infiltrating said once-filled structure a second time by encasing the once-filled structure within the container, pouring second particles, characterized as U.S. screen size −230, +270 mesh, into the container, vibrating said once-filled structure and second particles within said container whereby said second particles migrate through the voids within the once-filled structure, assisting said migration of said second particles by placing the head weight over the top of said second particles during said vibration to form a second-filled structure, infiltrating said second-filled structure a third time by encasing the second-filled structure within the container, pouring third particles, characterized as less than 10 micron particles, into the container, vibrating said second-filled structure and third particles within said container whereby said third particles migrate through the voids within the second-filled structure, and assisting said migration of said third particles by placing the head weight over the top of said third particles during said vibration to form a third-filled structure;

(c) vacuum impregnating the third-filled structure with a precursor selected from the group consisting of phenolic resins, epoxy resins, furan resins, thermo-plastic carbon, coal tar pitch or petroleum pitch and;

(d) heat-treating the impregnated filled structure to form a reinforced composite wherein said heat-treating includes heating the impregnated structure at a rate of 30° per hour to a temperature of approximately 1,000° C., cooling the heated structure to below 400° C., reheating the cooled structure to between 2,500° C. to 3,000° C. at a rate of approximately 200° per hour.

16. An improved method for fabricating a reinforced composite which comprises:

(a) assembling rigidized rods composed of a material selected from the group consisting of carbon, ceramic, metals and combinations thereof, into a three-dimensional geometric structure such that all interstitial voids have interconnecting nexuses;

(b) infiltrating dry flowable particles composed of a material selected from the group consisting of carbon, ceramic, metals and combinations thereof, into the said structure while vibrating the structure whereby the interstitial voids within the structure are substantially filled; and (c) sintering the filled structure whereby to form said reinforced composite.

* * * * *